United States Patent [19]

Petersen et al.

[11] Patent Number: 5,391,354
[45] Date of Patent: Feb. 21, 1995

[54] PROCESS FOR GAS PHASE CONVERSION OF DIETHYLZINC TO ZINC OXIDE POWDER

[75] Inventors: George E. Petersen, Fremont; Randall N. Robinson, San Jose, both of Calif.

[73] Assignee: General Electric Company, San Jose, Calif.

[21] Appl. No.: 112,923

[22] Filed: Aug. 30, 1993

[51] Int. Cl.$^6$ ............................................. C01G 9/02
[52] U.S. Cl. ..................................... 422/129; 423/622
[58] Field of Search ............... 422/129, 123, 125; 423/622, 245.2, 623

[56] References Cited

U.S. PATENT DOCUMENTS

| | | | |
|---|---|---|---|
| 2,154,603 | 4/1939 | Bley | 423/629 |
| 4,721,610 | 1/1988 | Yoshida et al. | 423/622 |
| 4,808,398 | 2/1989 | Heistand, II | 423/622 |
| 4,861,572 | 8/1989 | Sugoh et al. | 423/622 |
| 5,013,532 | 5/1991 | Sresty | 423/622 |
| 5,108,697 | 4/1992 | Esposito et al. | 376/306 |

FOREIGN PATENT DOCUMENTS 283748 10/1965 Australia ........................... 423/622

Primary Examiner—Robert J. Warden
Assistant Examiner—Hien Tran
Attorney, Agent, or Firm—J. E. McGinness

[57] ABSTRACT

A vapor of diethylzinc or dimethylzinc is reacted with water vapor to form very small particles of depleted zinc oxide which are entrained in the gas flow. In accordance with one version of the method, a spray nozzle is used to mix liquid diethylzinc with dry nitrogen to prevent combustion. The nozzle sprays the diluted diethylzinc into a chamber heated up to its boiling point of 118° C. to completely vaporize the diethylzinc. The diluted diethylzinc gas is then reacted with water vapor to form a fume of very small zinc oxide particles entrained in ethane gas without combustion. A similar process can be used to convert dimethylzinc into depleted zinc oxide powder. In accordance with another version of the process, an inert gas stream is saturated with diethylzinc or dimethylzinc vapor by passing a dry inert gas through a vessel containing liquid diethylzinc or dimethylzinc. A second inert gas stream is saturated with water vapor in a similar manner. These two gas streams will chemically react to form a fume of very small zinc oxide particles.

6 Claims, 2 Drawing Sheets

PROCESS FOR GAS PHASE CONVERSION OF DIETHYLZINC TO ZINC OXIDE POWDER

FIELD OF THE INVENTION

This invention generally relates to the operation and safety of water-cooled nuclear reactors. In particular, the invention relates to methods for minimizing the risk of exposure of workers to radioactive emissions during reactor shutdown for refueling and/or maintenance.

BACKGROUND OF THE INVENTION

A major hazard in water-cooled nuclear reactors is the accumulation of radioactive substances in the structural portions of the reactor. The buildup of radioactive nuclides occurs on the inner surfaces of components which are in contact with the reactor water. This includes both the primary recirculation circuit and the reactor water cleanup system.

During reactor shutdown, workers are exposed to radiation emanting from stainless steel internal walls and inner surfaces of piping. Radioactive materials retained in oxide films which have accumulated on wall and piping surfaces are a major source of radiation exposure. The radioactivity has been found to be predominantly due to the Co-60 isotope. As a result, a substantial effort has been made to identify the key parameters which affect Co-60 buildup and to determine and implement methods for limiting that buildup.

The radiation buildup, controlled mainly by the Co-60 isotope concentration, occurs by two processes. First, the Co-60 which is dissolved in the reactor water incorporates into the crystalline structure of the oxide film as the latter is formed on the stainless steel surfaces. Second, the Co-60 isotope sorbs onto the surfaces of particulates floating in the reactor water or on the fuel. Particles which contain sorbed Co-60 tend to deposit in regions of relatively low water flow velocity. This leads to regions of higher radioactivity which are commonly referred to as "hot spots".

The use of very dilute (trace) concentrations of zinc oxide in the reactor water has been demonstrated, both in the laboratory and in boiling water reactors, to limit the incorporation of Co-60 into the oxide film. Zinc oxide is also used in the cooling water of some nuclear reactors to inhibit intergranular stress corrosion cracking of pipes and internal reactor parts. In some nuclear reactors a slurry of zinc oxide is injected into the reactor feedwater. In other plants a passive system is used where a portion of the reactor feedwater flows through a tank containing zinc oxide pellets. Either process requires a zinc oxide powder of small particle size that is either made into a slurry with water or pressed and sintered into pellets.

Naturally occurring zinc contains Zn-64 isotope which is converted to radioactive Zn-65 in a nuclear reactor. To prevent the formation of Zn-65 isotope, the Zn-64 can be removed from diethylzinc or dimethylzinc by gas centrifuges. The diethylzinc or dimethylzinc is then reacted with water and heated to produce zinc oxide Fumed zinc oxide powder made by the metal vapor process can be purchased to meet the requirement for small-sized particles (i.e., $\sim 0.1$ $\mu$m) for nuclear power plants that use unisotopically altered zinc in either the slurry or pellet form. Such known powder has a surface area of about 10 m$^2$/gm. For plants that use zinc oxide isotopically depleted in the Zn-64 isotope, however, the conventional liquid phase process for converting diethylzinc to depleted zinc oxide produces a powder of much larger average size that requires further physical processing to mill and separate a fine particle fraction suitable for slurry injection or pellet fabrication.

SUMMARY OF THE INVENTION

The present invention is a process and apparatus for the gas phase conversion of diluted diethylzinc to depleted zinc oxide powder. As used herein, the term "zinc oxide" encompasses anhydrous and/or hydrated zinc oxide. The resulting powder has a surface area substantially greater (e.g., 100–125 m$^2$/gm) than that of fumed zinc oxide produced by the metal vapor process.

In accordance with one version of this process, a spray nozzle is used to mix liquid diethylzinc with dry nitrogen to prevent combustion of the diethylzinc or the reaction product ethane by dilution below the flammability limit. The nozzle sprays the diluted diethylzinc into a chamber heated to its boiling point of 118° C. to completely vaporize the diethylzinc. Other methods of obtaining a diluted mixture of diethylzinc in an inert gas are possible, such as by passing inert gas through the liquid diethylzinc or by spraying diethylzinc into a packed column with a countercurrent gas flow with or without additional heating.

The diluted diethylzinc gas then flows into a duct carrying a large volume of ambient air. On contact with the water vapor normally present in the ambient air, the dilute diethylzinc gas reacts to form a fume of very small zinc oxide particles entrained in ethane gas without combustion. A high ratio of air to diethylzinc is used to maintain a low density of diethylzinc particles in the air stream and provide sufficient cooling to dissipate the heat of the reaction. In place of ambient air, other gases could be used, such as steam or inert gas and water vapor mixtures. The zinc oxide fume and ambient air then flow from the duct into a filter chamber where the zinc oxide is filtered out and collected.

A similar process can be used to convert dimethylzinc into depleted zinc oxide powder. Diluted dimethylzinc is sprayed into a chamber heated to its boiling point of 46° C. to completely vaporize the dimethylzinc. The dimethylzinc is then reacted with water vapor to produce a fume of very small zinc oxide particles entrained in methane gas without combustion.

In accordance with another version of the process of the invention, the vapor pressure of diethylzinc at ambient temperature is used to regulate the concentration of diethylzinc in an inert gas, that at saturation will have a flammability below that of 3% diethylzinc in air. An inert gas stream is saturated with diethylzinc vapor by passing a dry inert gas through a vessel containing diethylzinc. A second inert gas stream is saturated with water vapor in a similar manner. These two gas streams will chemically react to form a fume of very small zinc oxide particles without combustion of the diethylzinc or the reaction product ethane due to the dilution and by excluding air. A gas ejector is used to mix the inert gas saturated with water vapor and the inert gas saturated with diethylzinc vapor.

Other methods of obtaining a diluted mixture of water or diethylzinc in an inert gas are possible, such as, spraying water or diethylzinc into a packed column with a countercurrent gas flow. Gas mixing nozzles or other devices may be used in place of the gas ejector.

During mixing, the diethylzinc vapor reacts with the water vapor to form depleted zinc oxide particles which are entrained to form a zinc oxide fume in the flowing gas mixture. The zinc oxide fume, ethane and inert gas then flow into a filter chamber where the zinc oxide particles are filtered out and collected.

Again a similar process can be used to convert dimethylzinc into depleted zinc oxide powder.

DETAILED DESCRIPTION OF THE PREFERRED EMBODIMENTS

Figure 1:
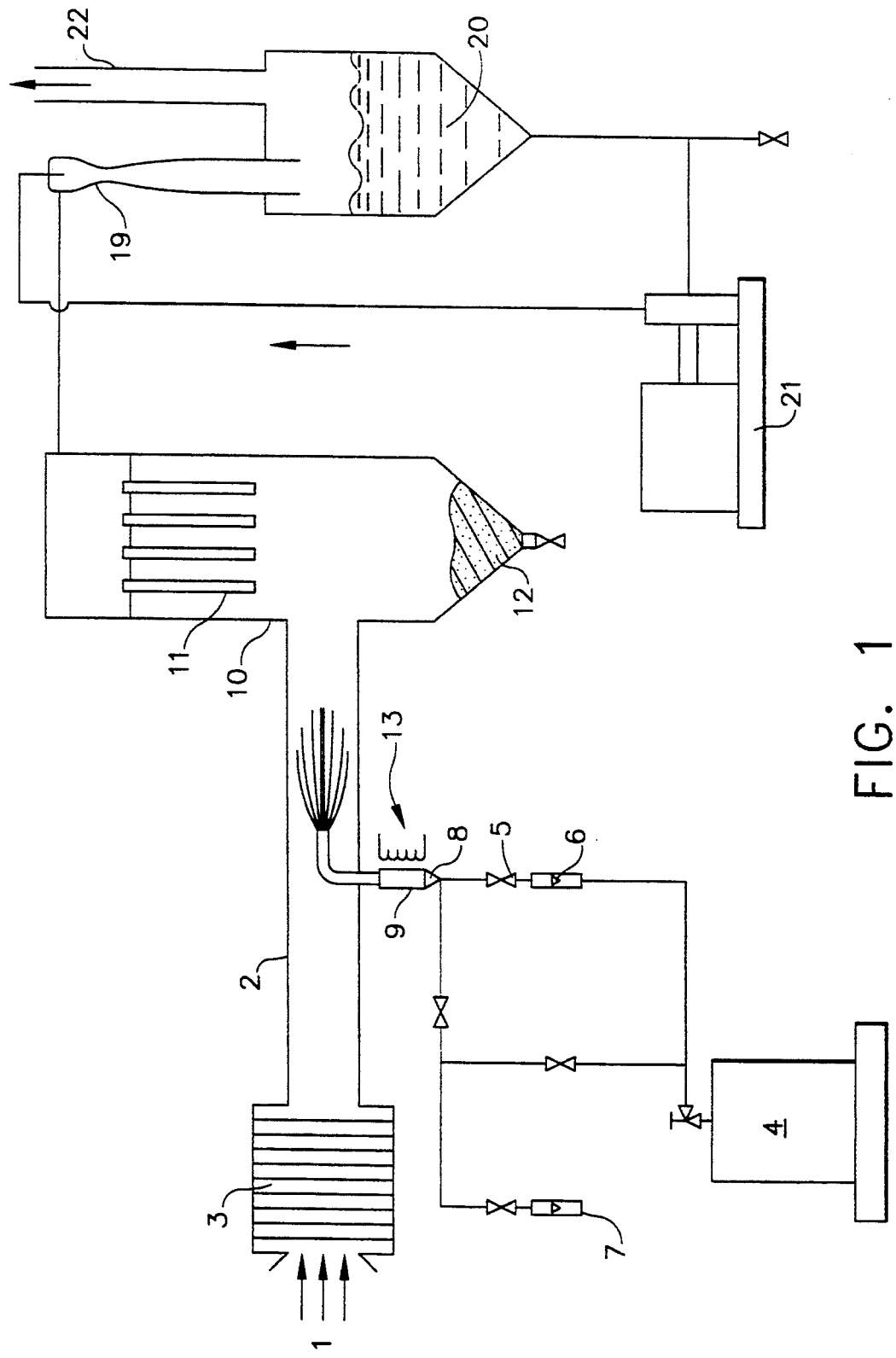
FIG. 1 is a block diagram showing the equipment which is used in the process for gas phase conversion of diethylzinc to zinc oxide powder in accordance with a first preferred embodiment of the invention.

In accordance with a first preferred embodiment (shown in FIG. 1) for carrying out the method of the invention, before entering a duct 2 a flow of air 1 is cleaned to remove any contaminating dust with an absolute filter 3. Diethylzinc in liquid form is supplied from a weighing tank 4. The flow of diethylzinc is controlled by operation of a valve 5 and a meter 6 suitable for this purpose through piping that can be purged before and after use with dry nitrogen from a metered source 7.

In accordance with the process, a spray nozzle 8 is used to mix the liquid diethylzinc with the dry nitrogen to prevent combustion of the diethylzinc or the reaction product ethane by dilution below the flammability limit. The flow of dry nitrogen at the spray nozzle 8 must be maintained to provide adequate volume for the dilution and fluid energy for the atomization of the liquid diethylzinc.

The nozzle sprays the diluted diethylzinc into a vaporizing chamber 9, which is heated by a heater 13 up to the boiling point of diethylzinc (i.e., 118° C.), whereby the diethylzinc is completely vaporized. The vaporizer 9 can take the form of an externally heated pipe with temperature controls to prevent overheating.

The diluted diethylzinc gas then flows into duct 2, which carries a large volume of ambient air after passage through filter 3. The ambient air can be either drawn through the duct by a pump (not shown) or pushed through the duct by a fan (not shown). On contact with the water vapor normally present in the ambient air, the dilute diethylzinc gas reacts to form a fume of very small zinc oxide particles entrained in ethane gas without combustion. A high ratio of air to diethylzinc is used to maintain a low density of diethylzinc particles in the air stream and provide sufficient cooling to dissipate the heat of the reaction. Also the ratio of water vapor to diethylzinc should be in excess of the stoichiometric ratio, the preferred ratio being approximately 4 moles of water to 1 mole of diethylzinc.

The zinc oxide fume and ambient air then flow from the duct into a filter chamber 10 having a plurality of filters 11. The zinc oxide particles entrained in the gas are filtered out and collected at the bottom of filter chamber 10. The chamber 10 and filters 11 suitable for collecting the zinc oxide powder 12 is a commercially available unit complete with exhaust fan (not shown).

Optionally, the zinc oxide powder may be dried in an oven, e.g., 200° C. for 2 hr, to remove moisture absorbed by the particle surfaces, the amount of moisture prior to drying being as much as 25 wt. % of the powder. The elimination of moisture stabilizes the powder and allows the true weight of the zinc oxide to be determined.

The ethane and nitrogen gas exits the filter chamber 10 and optionally flows into an off-gas scrubber comprising an ejector 19. The ejector also serves to suck ambient air through duct 2 and filter chamber 10. The ejector 19 is supplied with recirculating liquid 20 by operation of a pump 21. Any particulate contamination in the gas adheres to the droplets ejected by ejector 19. The scrubbed gas exits the scrubber via pipe 22. The off-gas scrubber is typical of several commercial units that would be serviceable for this purpose.

Figure 2:
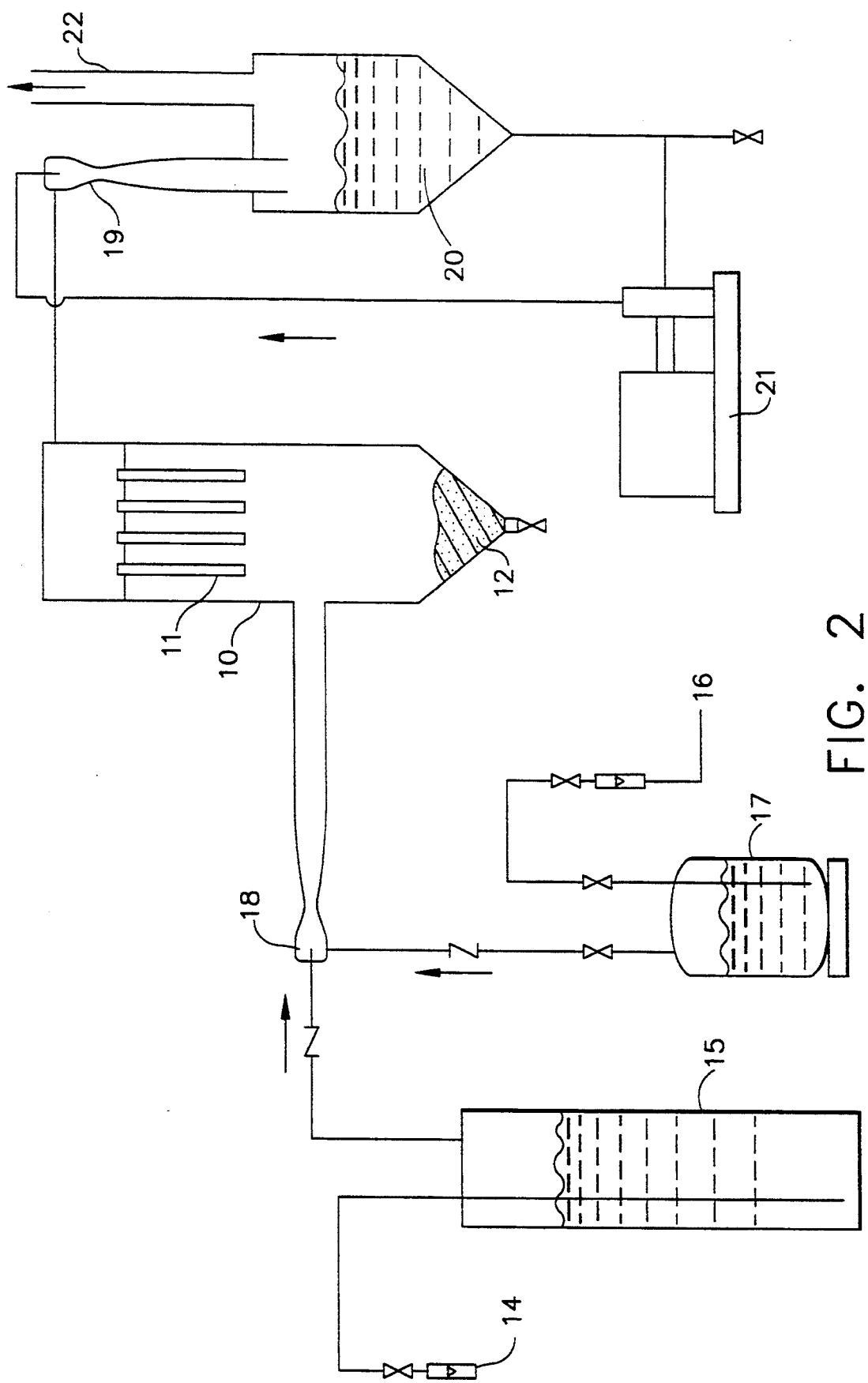
FIG. 2 is a block diagram showing the equipment which is used in the process for gas phase conversion of diethylzinc to zinc oxide powder in accordance with a second preferred embodiment of the invention.

In accordance with a second preferred embodiment (shown in FIG. 2) for carrying out the method of the invention, the vapor pressure of diethylzinc at ambient temperature is used to regulate the concentration of diethylzinc in an inert gas, that at saturation will have a flammability below that of 3% diethylzinc in air. An inert gas stream 14 is passed through a tank 15 of water to saturate the inert gas with water vapor. A dry inert gas stream 16 is passed through liquid diethylzinc in a weighed tank 17 to saturate it with diethylzinc vapor.

The respective saturated inert gas streams flow into a gas ejector 18. Gas ejector 18 is used to mix the inert gas saturated with water vapor and the inert gas saturated with diethylzinc vapor. During mixing, the diethylzinc vapor chemically reacts with the water vapor to form a fume of very small depleted zinc oxide particles which are entrained to form a zinc oxide fume in the flowing gas mixture without combustion of the diethylzinc or the reaction product ethane due to the dilution and by excluding air.

The zinc oxide fume, ethane and inert gas then flow into filter chamber 10, which may be identical to the filter chamber shown in FIG. 1. The zinc oxide particles are filtered out by filters 11 and a zinc oxide powder 12 is collected by gravity at the bottom of chamber 10.

The ethane and inert gas exits the filter chamber 10 and optionally flows into an off-gas scrubber identical to that shown in FIG. 1. The ejector 19 is supplied with recirculating liquid 20 by operation of a pump 21. Any particulate contamination in the gas adheres to the droplets ejected by ejector 19. The scrubbed gas exits the scrubber via pipe 22.

The foregoing method steps and apparatus have been disclosed for the purpose of illustration. Variations and modifications of the disclosed method and apparatus will be readily apparent to practitioners skilled in the art of converting diethylzinc or dimethylzinc into depleted zinc oxide powder. For example, other methods of obtaining a diluted mixture of diethylzinc in an inert gas are possible, such as by passing inert gas through the liquid diethylzinc or by spraying diethylzinc into a packed column with a countercurrent gas flow with or without additional heating. In place of ambient air, other gases could be used, such as steam or inert gas and water vapor mixtures. Also other methods of obtaining a diluted mixture of water or diethylzinc in an inert gas are possible, such as spraying water or diethylzinc into a packed column with a countercurrent gas flow. Gas mixing nozzles or other devices may be used in place of the gas ejector. All such variations and modifications are intended to be encompassed by the claims set forth hereinafter.

We claim:

1. A system for converting a zinc compound in liquid form to zinc oxide powder, comprising:
- a vessel containing a zinc compound in liquid form, the zinc compound being selected from the group consisting of diethylzinc and dimethylzinc;
- a source of dry nitrogen gas;
- a first conduit connected to an outlet of said vessel;
- a second conduit connected to an outlet of said source of dry nitrogen gas;
- means for atomizing the liquid zinc in a flow of compound the dry nitrogen gas, said atomizing means being connected to said first conduit for receiving liquid zinc compound from said vessel and to said second conduit for receiving dry nitrogen gas from said source;
- means coupled to the atomizing means for heating the atomized liquid zinc compound in the dry nitrogen gas to a temperature above the vaporation temperature of the zinc compound thereby forming a gas mixture containing gaseous zinc compound;
- a third conduit connected to an ambient air inlet for receiving ambient air;
- means for injecting the gas mixture containing gaseous zinc compound into ambient air inside said third conduit, wherein a fume of zinc oxide particles suspended in a mixture of gaseous reaction products is formed; and
- means for separating the zinc oxide particles from the gaseous reaction products to form zinc oxide powder.

2. The system as defined in claim 1, wherein said separating means comprises a filter.

3. A system for converting a zinc compound in liquid form to zinc oxide powder, comprising:
- a first vessel containing a zinc compound in liquid form, the zinc compound being selected from the group consisting of diethylzinc and dimethylzinc;
- a second vessel containing water;
- means for supplying inert gas;
- a first conduit connecting to said means for supplying inert gas and said first vessel for passing inert gas through the liquid zinc compound in said first vessel, said first conduit having an outlet below the surface of the liquid zinc compound in said first vessel;
- a second conduit connecting to said means for supplying inert gas and said second vessel for passing inert gas through the water in said second vessel, said second conduit having an outlet below the surface of the water in said second vessel;
- a third conduit connected to an outlet of said first vessel located above the surface of the liquid zinc compound;
- a fourth conduit connected to an outlet of said second vessel located above the surface of the water;
- a gas ejector connected to said third and fourth conduits for mixing vapors from said first and second vessels to form a fume of zinc oxide particles suspended in a mixture of gaseous reaction products; and
- means for separating the zinc oxide particles from the gaseous reaction products to form zinc oxide powder.

4. The system as defined in claim 3, wherein said separating means comprises a filter.

5. A system for converting a zinc compound in liquid form to zinc oxide powder, comprising:
- a vessel containing a zinc compound in liquid form, the zinc compound being selected from the group consisting of diethylzinc and dimethylzinc;
- a source of dry inert gas different than ambient air;
- a first conduit connected to an outlet of said vessel;
- a second conduit connected to an outlet of said source of dry inert gas;
- means for atomizing the liquid zinc compound in a flow of the dry inert gas, said atomizing means being connected to said first conduit for receiving liquid zinc compound from said vessel and to said second conduit for receiving dry inert gas different than ambient air from said source;
- means coupled to the atomizing means for heating the atomized liquid zinc compound in the dry inert gas to a temperature above the vaporization temperature of the zinc compound, thereby forming a gas mixture containing gaseous zinc compound;
- a third conduit connected to an ambient air inlet for receiving ambient air;
- means for injecting the gas mixture containing gaseous zinc compound into ambient air inside said third conduit, wherein a fume of zinc oxide particles suspended in a mixture of gaseous reaction products is formed; and
- means for separating the zinc oxide particles from the gaseous reaction products to form zinc oxide powder.

6. The system as defined in claim 5, wherein said separating means comprises a filter.

* * * * *